Feb. 21, 1967  R. L. GUNGLE  3,304,865
SELF-SEALING, UNBONDED, ROCKET MOTOR NOZZLE CLOSURE
Filed April 21, 1965  2 Sheets-Sheet 1

INVENTOR
ROBERT L. GUNGLE

BY
ATTORNEYS

Feb. 21, 1967 R. L. GUNGLE 3,304,865
SELF-SEALING, UNBONDED, ROCKET MOTOR NOZZLE CLOSURE
Filed April 21, 1965 2 Sheets-Sheet 2

INVENTOR
ROBERT L. GUNGLE

BY
ATTORNEYS

United States Patent Office 3,304,865
Patented Feb. 21, 1967

3,304,865
SELF-SEALING, UNBONDED, ROCKET MOTOR NOZZLE CLOSURE
Robert L. Gungle, Hampton, Va., assignor to the United States of America as represented by the Administrator of the National Aeronautics and Space Administration
Filed Apr. 21, 1965, Ser. No. 449,901
12 Claims. (Cl. 102—49)

The invention described herein may be manufactured and used by or for the Government of the United States of America for governmental purposes without the payment of any royalties thereon or therefor.

This invention relates to a nozzle closure assembly, and more particularly to a self-sealing, unbonded, rocket motor nozzle closure.

Many devices are in existence for closing the nozzle entrance of rocket motors. Among the most common presently used is a molded, lightweight foam plastic closure member which is bonded to the rocket nozzle either forward or aft of the nozzle minimum throat area. Although this type of closure member functions satisfactorily, it has many disadvantages. One such disadvantage is the possible chemical reaction between the bonding agent and rocket nozzle material which could reduce the structural properties of the nozzle increasing the possibility of material failure. Furthermore, the interior shape of the nozzle is altered unpredictably by the bond or closure residue during ejection of the closure member. This results in uneven burning of the residue, and in some cases failure of the nozzle material is initiated from this cause. Residue in the nozzle throat or exit cone also results in asymmetrical thrust components during initial burning of the rocket motor. Replacement of this type of damaged or defective closure is difficult and can result in serious damage to lightweight plastic nozzles now used in conjunction with some rocket motors.

Another prior art closure arrangement consists of a two-piece arrangement which fits on either side of the minimum diameter of the nozzle. A fastener is then positioned through one of the pieces and threaded into the other drawing the two against the minimum diameter area. One of the disadvantages of this arrangement is that the fastener occupies the center of the rocket nozzle which might otherwise be utilized for receiving rocket motor ignition apparatus in the form of a connector and wires. Another problem with this arrangement is that upon handling and operation of other stages of the vehicle, the vibrations tend to loosen the closure member spoiling its effectiveness as a closure and seal.

Closure members have also been constructed from resilient material, such as rubber, in the form of a solid plug that is inserted into the nozzle. This arrangement overcomes the difficulties with bonding and the plug can be provided with an aperture to receive ignition apparatus. However, it has been found that when this type of plug is inserted at ambient pressure and then placed in space, it tends to creep and over a period of time will loosen itself thus failing as a closure member.

The present invention overcomes the above-described difficulties by providing a molded rocket closure member which is somewhat pliable and conforms to the general configuration of the nozzle. The closure member, however, is capable of receiving a flexible diaphragm and snap ring which expand the closure member into engagement with the nozzle. The closure member is thus retained and sealed to the nozzle without bonding and the use of a centrally disposed fastener.

It is therefore an object of the invention to provide a nozzle closure member which does not have to be bonded to the nozzle.

Yet another object of the invention is to provide a nozzle closure member which does not leave undesirable residue in the nozzle after closure ejection.

Still another object of the invention is to provide a nozzle closure member having sealing capabilities which are generally increased up to the time of closure ejection.

A further object of the invention is to provide a nozzle closure which provides means for passing rocket motor ignition wires through the sealed chamber.

An added object of the invention is to provide a nozzle closure which is an aid to ignition of the rocket motor by retaining hot igniter gases within the chamber to a predetermined pressure.

Still another object of the invention is to provide a nozzle closure which will prevent foreign objects or materials from entering the rocket chamber during ground handling and storage.

Another object of the invention is to provide a closure member which is easy to install initially and which may be easily removed for inspection or replacement without damage to the nozzle.

An additional object of the invention is to provide a nozzle closure member which is of simple construction, lightweight and economical to manufacture and maintain.

These and other objects and advantages of the invention will become more apparent upon reading the specification in conjunction with the accompanying drawings.

Basically, the invention relates to a nozzle closure assembly which has a nozzle closure member of a generally cylindrical shape. A raised lip portion is formed integral with the closure member and conforms generally to the shape of the nozzle entrance. A slot is located on the interior of the lip and receives a flexible diaphragm which forces the lip into sealing and retaining position with the nozzle entrance. Also formed integral with the closure member is a raised skirt portion, spaced from the lip portion and also generally conforming to the shape of the nozzle. A slot is formed within the interior of the skirt and receives a snap ring which expands the skirt into engagement with the nozzle. A closure member nose piece is formed integral with and located adjacent the lip portion to complete the closure structure. The nose portion may be designed to receive ignition apparatus.

Figure 1:
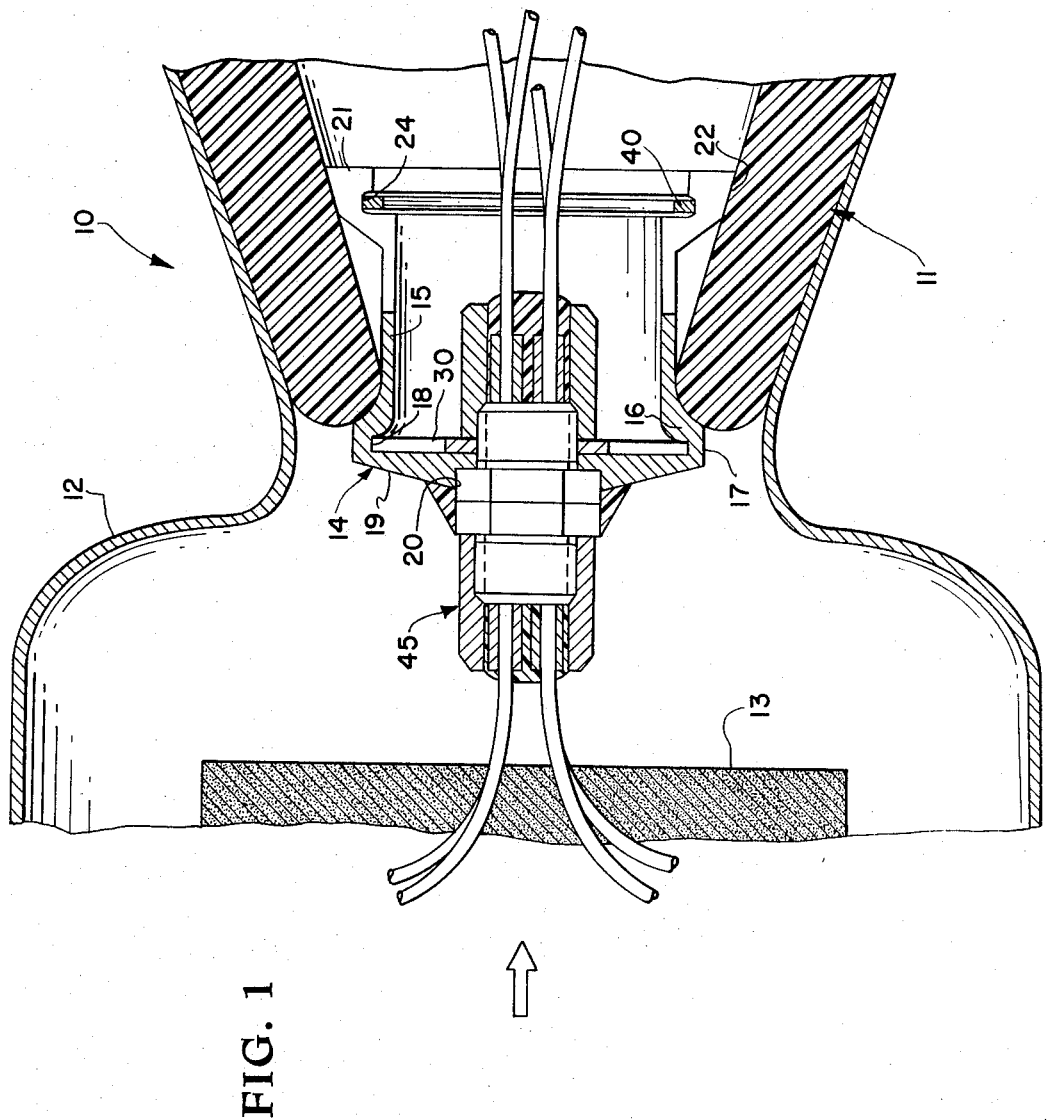
FIG. 1 is a cross-sectional view of the invention shown installed in a nozzle as a closure member.
Figure 2:
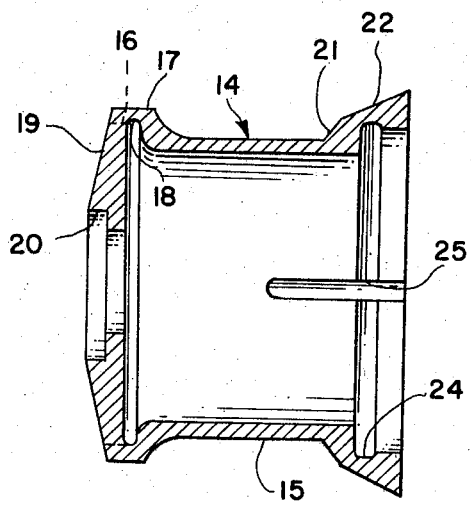
FIG. 2 is a cross-sectional view of the plug or molded closure member.

Referring now more specifically to the details of the invention, FIG. 1 shows the nozzle closure assembly designated generally by the reference numeral 10.

Associated with the assembly is a conventional rocket nozzle 11 which is connected to a rocket motor casing 12 having propellant 13.

The closure member or plug 14 is associated with the nozzle entrance and throat as shown in FIG. 1, and has a generally cylindrical body portion 15. The body portion has a raised lip 16 with a flattened area 17 adapted to contact the nozzle. Formed within the lip 16 is a lip slot 18 for purposes which will be explained more fully hereinafter.

The lip of the closure member tapers into a nose section 19 which functions to close off one end of the cylinder. Since, however, it is desirable to have a closure member which will receive ignition apparatus for the propellant, the nose section 19 is provided with an opening 20 to receive such apparatus.

Spaced from the lip 16, and formed with the body 15, is a skirt portion 21. It also is a raised portion having a platform or bevel 22 which is adapted to contact the interior of the nozzle. A slot 24 is formed within the skirt 21 for purposes which will be explained more fully hereinafter. The edge of the skirt may be split and gaps 25 left at intervals to facilitate expanding the skirt portion into contact with the nozzle.

The closure member is made from a pliable material, such as plastic or rubber, which is easy to mold, install in the nozzle and to otherwise work with. This material is also of a nature that will make a good seal with the nozzle.

Figure 3:
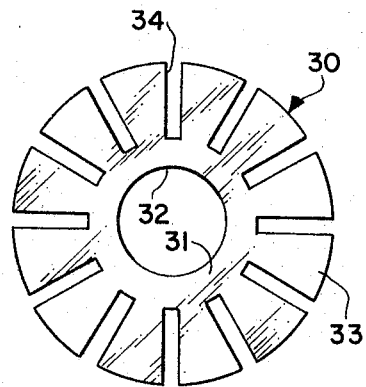
FIG. 3 is a plan view of the flexible diaphragm.

A diaphragm designated generally by the reference numeral 30 (FIGS. 1 and 3) fits within the lip slot 18. The diaphragm 30 is a disc or washer-like member having a body 31 with a central aperture 32. The aperture 32 is adapted to receive apparatus for igniting the rocket propellant to be explained more fully hereinafter. The body portion 32 has a series of slits 34 forming fingers 33 about the diaphragm. The diaphragm is a metallic member and thin enough so that the fingers 33 have a certain amount of resiliency. Thus, when the diaphragm is inserted in the slot 18 and the closure member pressed against a nozzle area of suitable diameter, the fingers 33 tend to urge the lip into engagement with the nozzle.

Figure 4:
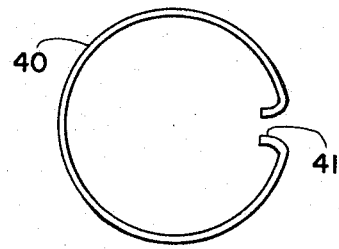
FIG. 4 is a plan view of the closure assembly snap ring.

A snap ring 40, having tabs 41 (FIG. 4), of conventional design, is associated with the skirt slot 24. The snap ring 40 has a gap which allows the ring to be pinched together for insertion in the slot, and the inherent resiliency thereof expands it to its normal position forcing the skirt into contact with the nozzle.

As shown in FIG. 1, the closure member is adapted to receive apparatus 45, for igniting propellant. This apparatus may include such items as electrical connectors, wires, etc.

Operation

From the above description, the operation of the device is believed to be apparent.

The closure member or plug 14 is installed by first turning the skirt portion thereof inside out so as to enable the diaphragm 30 to be inserted in the lip slot 18. The skirt 21 is then returned to its normal position and the plug inserted in the nozzle from the nozzle entrance. Since the diaphragm fingers 33 have a certain amount of resiliency, it is possible to force the plug a small distance into the nozzle entrance until the lip 16 firmly engages the nozzle forming a seal and retention arrangement.

After the plug is properly positioned, the snap ring 40 is inserted from the nozzle exit and allowed to expand in the skirt slot 24. This forces the skirt into engagement with the nozzle as shown in FIG. 1.

The igniter apparatus 45 may be positioned and sealed in the nose opening 20 prior to installation in the nozzle, if this type of apparatus is to be used. It is to be understood that it is within the scope of the invention to make the nose without an opening, thereby forming a complete closure.

The closure member remains in position until the propellant is ignited and sufficient pressure builds up within the rocket chamber to overcome the flexible diaphragm 30. Obviously, the thickness of the diaphragm, the number of slits, or the properties of the material may be varied to determine at what pressure the diaphragm will fail. Upon failure of the diaphragm the entire closure assembly is exhausted from the nozzle with the exhaust gases.

From the above description, it is apparent that the closure assembly is discharged without leaving closure residue as is the case with a bonded arrangement. The flexible diaphragm and snap ring form a two-point contact arrangement on either side of the smallest diameter of the nozzle thus assuring a closure member which is firmly retained within the nozzle before rocket ignition. The device is light in weight, simple to install and remove for maintenance purposes. Furthermore, the closure assembly is adapted to receive rocket motor ignition apparatus which is of importance when space is severely restricted. Since the diaphragm material thickness can be varied to adjust various failing pressures, the necessary pressure for optimum ignition of the rocket motor can be obtained. Obviously, the closure member is shelf-retaining and does not require bonding to the nozzle materials eliminating the possibility of an undesirable asymmetric thrust component due to closure residue or weakening of the nozzle structure due to bonding agent reaction with the nozzle. In view of the design of the closure member including the lip and diaphragm arrangement, sealing capabilities are generally increased as pressure builds up in the casing up to the time of closure injection aiding ignition of the rocket motor by retaining the hot ignition gases with the chamber to a predetermined pressure. Field replacement of the closure is generally simplified and pressure tests can be conducted immediately after installation without waiting for bonding materials to cure. With this closure member it is also possible to install an electrical connector to provide a rapid and positive disconnecting of the igniter and wire during ejection.

Since there are, obviously, many modifications of the present invention possible in the light of the above teachings, it is therefore to be understood that within the scope of the appended claims the invention may be practiced otherwise than as specifically described.

What is claimed as new and desired to be secured by Letters Patent of the United States is:

1. A nozzle closure assembly or the like comprising: a closure member formed generally to the shape of the nozzle; a flexible diaphragm carried by said closure member; said flexible diaphragm forcing the closure member against the nozzle entrance; and an expanding ring engaging said closure member inward of said nozzle entrance and forcing said closure member to engage said nozzle whereby said closure member is retained in and seals said nozzle.

2. A nozzle closure assembly or the like comprising: a molded closure member; said closure member being shaped to have point contact at the nozzle entrance and in the throat of the nozzle; a flexible diaphragm engaging the closure member at the nozzle entrance forcing contact therewith; and an expanding ring engaging the closure member in the nozzle throat forcing contact therewith whereby a seal and retention structure is affected.

3. A nozzle closure assembly or the like as in claim 2 wherein said flexible diaphragm has a greater diameter than the smallest diameter of said nozzle.

4. A nozzle closure assembly or the like as in claim 2 wherein said flexible diaphragm is weakened at points to fail upon a certain pressure applied thereagainst to allow discharge of said closure member through said nozzle.

5. A nozzle closure assembly or the like as in claim 2 wherein said expanding ring is of a greater diameter than the smallest diameter of the nozzle.

6. A nozzle closure assembly or the like as in claim 2, wherein said closure member and flexible diaphragm have a central aperture to receive motor ignition apparatus.

7. A nozzle closure assembly or the like as in claim 2 wherein said closure member is pliable and capable of being turned inside out to facilitate installation of said flexible diaphragm and location in said nozzle.

8. A nozzle closure assembly or the like comprising: a generally cylindrical closure member; said closure member having a raised lip portion formed generally to the shape of the nozzle entrance; a slot located within said lip; a flexible diaphragm engaging said slot and forcing said lip to contact said nozzle entrance; said closure member having another raised skirt portion spaced from said lip portion and formed generally to the shape of the nozzle throat; a slot located in said skirt; a snap ring engaging said slot forcing said skirt to contact said nozzle throat whereby said lip and skirt seal and retain said closure member to said nozzle; and a nose portion formed integral with said closure member to close said nozzle.

9. A nozzle closure assembly or the like as in claim 8 wherein said flexible diaphragm is slotted to fail upon a certain pressure applied thereagainst to allow discharge of said closure member.

10. A rocket nozzle closure assembly or the like as in claim 8 wherein said closure member is pliable and capable of being turned inside out to facilitate installation of said flexible diaphragm and location in said nozzle.

11. A rocket nozzle closure assembly or the like as in claim 8 wherein said closure member nose portion and flexible diaphragm have an aperture to receive rocket motor ignition apparatus.

12. A nozzle closure assembly or the like comprising: nozzle closure means for insertion in the nozzle; and separate means engaging the interior of the closure means fore and aft of the nozzle constriction for expanding the closure member into sealing and retaining position with the nozzle.

References Cited by the Examiner

UNITED STATES PATENTS

| | | | |
|---|---|---|---|
| 2,958,184 | 11/1960 | Sanders | 102—49 X |
| 3,020,710 | 2/1962 | Herzog | 60—35.6 |
| 3,121,310 | 2/1964 | Rice | 60—35.6 |
| 3,135,416 | 6/1964 | Royer | 220—27 X |

References Cited by the Applicant

UNITED STATES PATENTS

| | | |
|---|---|---|
| 2,685,837 | 8/1954 | Sage et al. |
| 2,776,623 | 1/1957 | Bonner. |
| 2,934,014 | 4/1960 | Smith et al. |

BENJAMIN A. BORCHELT, *Primary Examiner.*

V. R. PENDEGRASS, *Assistant Examiner.*